United States Patent
Bauer et al.

(10) Patent No.: US 9,951,919 B2
(45) Date of Patent: Apr. 24, 2018

(54) MICROPROJECTION LIGHTING MODULE FOR A MOTOR VEHICLE HEADLIGHT

(71) Applicant: ZIZALA LICHTSYSTEME GMBH, Wieselburg (AT)

(72) Inventors: Friedrich Bauer, Bergland (AT); Gerald Boehm, Ybbs (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 12 days.

(21) Appl. No.: 15/031,869

(22) PCT Filed: Oct. 20, 2014

(86) PCT No.: PCT/AT2014/050251
§ 371 (c)(1),
(2) Date: Apr. 25, 2016

(87) PCT Pub. No.: WO2015/058227
PCT Pub. Date: Apr. 30, 2015

(65) Prior Publication Data
US 2016/0265733 A1  Sep. 15, 2016

(30) Foreign Application Priority Data
Oct. 25, 2013 (AT) .............................. A 50692/2013

(51) Int. Cl.
*F21V 17/02* (2006.01)
*F21S 8/10* (2006.01)
(Continued)

(52) U.S. Cl.
CPC ......... *F21S 48/1275* (2013.01); *F21S 48/115* (2013.01); *F21S 48/1154* (2013.01);
(Continued)

(58) Field of Classification Search
CPC . F21V 17/02; F21V 1/00; F21V 11/00; B60Q 1/00; B60Q 3/00; B60Q 11/00
(Continued)

(56) References Cited

U.S. PATENT DOCUMENTS

| 5,418,583 A | 5/1995 | Masumoto |
| 2003/0076423 A1* | 4/2003 | Dolgoff .................. G03B 35/16 348/222.1 |

(Continued)

FOREIGN PATENT DOCUMENTS

| CH | 296715 A | 2/1954 |
| DE | 639774 C | 12/1936 |

(Continued)

OTHER PUBLICATIONS

Dross et al.,"Köhler Integrators Embedded into Illumination Optics Add Functionality", Proceeding of SPIE, Bd. 7103, Jan. 1, 2008 (Jan. 1, 2008), Seite 71030G, XP055022346, ISSN: 0277-786X, DOI: 10.1117/12/98111.

(Continued)

*Primary Examiner* — Edwyn Labaze
(74) *Attorney, Agent, or Firm* — Eversheds Sutherland (US) LLP

(57) ABSTRACT

The invention relates to a microprojection light module (1) for a motor vehicle headlight, comprising at least one light source (2) and at least one projection arrangement (3), which images the light exiting from the at least one light source (2) into a region in front of the motor vehicle in the form of at least one light distribution, wherein the projection arrangement (3) comprises: an entry optics (30), which consists of an array of micro entry optics (31); an exit optics (40), which consists of an array of micro exit optics (41), wherein each micro entry optics (31) is paired with exactly one micro exit optics (41), wherein the micro entry optics (31) are formed (Continued)

Figure 2A:
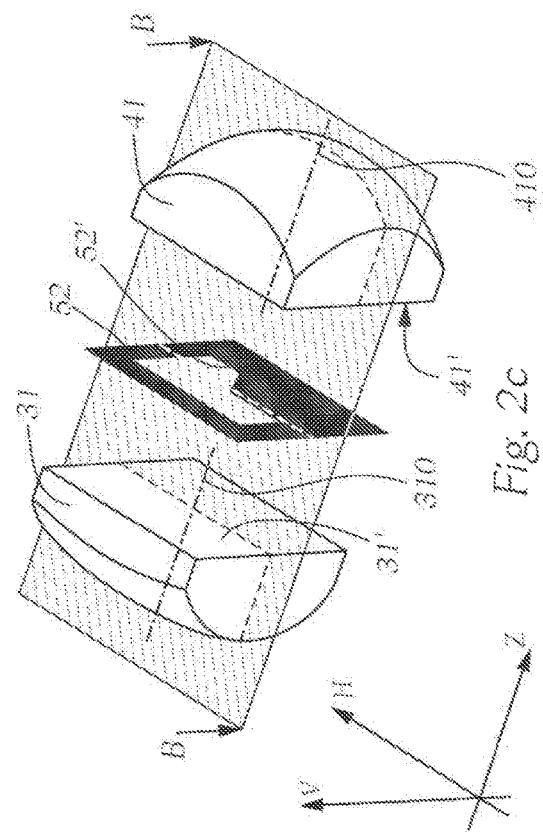

in such a way and/or the micro entry optics (31) and the micro exit optics (41) are arranged relative to one another in such a way that the light exiting from a micro entry optics (31) enters precisely only into the paired micro exit optics (41), and wherein the light pre-shaped by the micro entry optics (31) is imaged by the micro exit optics (41) into a region in front of the motor vehicle as at least one light distribution (LV1-LV5; GLV).

45 Claims, 9 Drawing Sheets

(51) Int. Cl.
    *G02B 3/00*     (2006.01)
    *G02B 27/09*     (2006.01)
    *F21Y 101/00*     (2016.01)

(52) U.S. Cl.
    CPC ........... *F21S 48/12* (2013.01); *F21S 48/1283* (2013.01); *F21S 48/145* (2013.01); *F21S 48/1721* (2013.01); *F21S 48/215* (2013.01); *G02B 3/0006* (2013.01); *G02B 27/0961* (2013.01); *F21Y 2101/00* (2013.01)

(58) Field of Classification Search
    USPC ......... 362/512, 507, 509, 520–522, 538–539
    See application file for complete search history.

(56) References Cited

U.S. PATENT DOCUMENTS

| | | | |
|---|---|---|---|
| 2004/0080938 A1* | 4/2004 | Holman | F21S 8/08 362/231 |
| 2008/0068852 A1* | 3/2008 | Goihl | F21S 48/115 362/509 |
| 2008/0316761 A1* | 12/2008 | Minano | G02B 3/0068 362/518 |
| 2009/0073706 A1* | 3/2009 | Tatara | B60Q 1/1423 362/487 |
| 2011/0051231 A1* | 3/2011 | Donval | G01J 1/04 359/361 |
| 2012/0155102 A1* | 6/2012 | Melzner | F21V 5/002 362/510 |
| 2013/0051014 A1* | 2/2013 | Sikkens | F21S 48/1154 362/235 |

FOREIGN PATENT DOCUMENTS

| | | |
|---|---|---|
| DE | 2235201 A1 | 2/1974 |
| DE | 4105213 A1 | 8/1992 |
| DE | 10039086 A1 | 2/2002 |
| EP | 0738903 A1 | 10/1996 |
| EP | 0738904 A1 | 10/1996 |
| EP | 0999407 A2 | 5/2000 |

OTHER PUBLICATIONS

First Office Action for Austrian Patent Application No. A 50692/2013 dated Oct. 2, 2014.
International Search Report for PCT/AT2014/050251 dated Jan. 27, 2015.
IPRP for PCT/AT2014/050251 dated Feb. 9, 2016.

\* cited by examiner

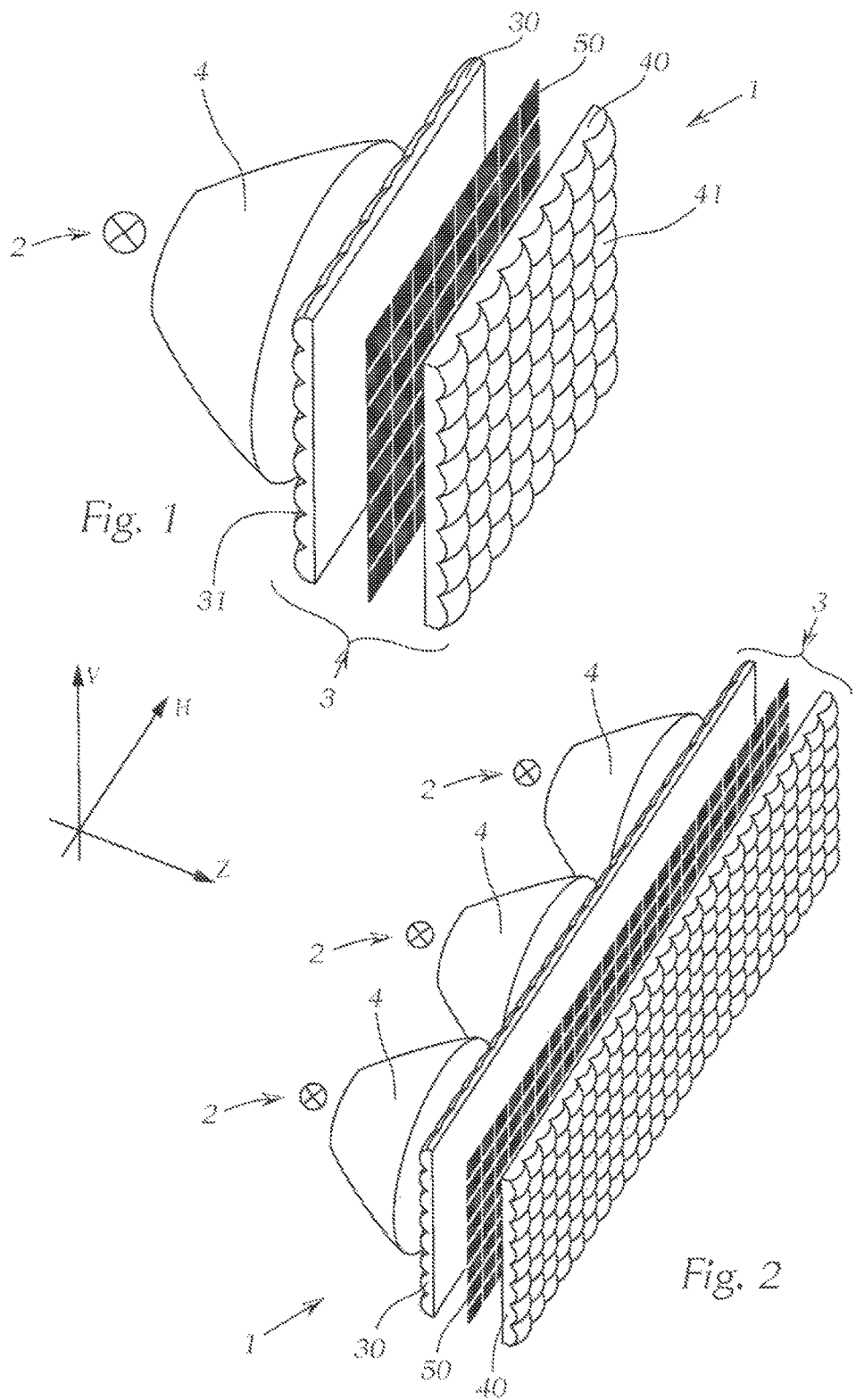

MICROPROJECTION LIGHTING MODULE FOR A MOTOR VEHICLE HEADLIGHT

The invention relates to a microprojection light module for a motor vehicle headlight, comprising
- at least one light source and
- at least one projection arrangement, which images the light exiting from the at least one light source into a region in front of the motor vehicle in the form of at least one light distribution.

The invention also relates to a lighting device for a motor vehicle headlight.

The invention additionally relates to a vehicle headlight.

Current light systems or light modules or vehicle headlights, in particular with use of light-emitting diodes as light sources, use complex, highly accurate and therefore costly LED light sources, the light of which is shaped to form a light distribution by means of a projection optics, for example a lens, where appropriate following prior passage of the light through a primary or ancillary optics. Due to the high costs, it is usually sought to create systems that are as efficient as possible. However, this leads to light systems etc. that continue to be comparable in terms of spatial requirement to conventional halogen light modules.

Attempts to reduce the focal length or generally the (shortest) distance of the light source from the reflector in order to obtain greater efficiency mean that the light module etc. has a much greater sensitivity to manufacturing tolerances, whereby a greater efficiency that would allow a smaller installation space requires complex and therefore costly design concepts.

One object of the invention is to create a light module for a motor vehicle headlight which has a reduced overall depth.

A further object of the invention is to create a light module for a motor-vehicle headlight that is insensitive to tolerances to the greatest possible extent.

These objects are achieved in accordance with the invention with a light module of the type mentioned in the introduction in that the projection arrangement comprises:
- an entry optics, which consists of a number of micro entry optics, which are preferably arranged in an array,
- an exit optics, which consists of a number of micro exit optics, which are preferably arranged in an array, wherein each micro entry optics is paired with exactly one micro exit optics, wherein the micro entry optics are formed in such a way and/or the micro entry optics and the micro exit optics are arranged relative to one another in such a way that substantially all the light exiting from a micro entry optics enters precisely only into the paired micro exit optics, and wherein the light pre-shaped by the micro entry optics is imaged by the micro exit optics into a region in front of the motor vehicle as at least one light distribution.

The wording "substantially all the light exiting" means here that it is sought to irradiate actually the entire light flux exiting from a micro entry optics solely into the paired micro exit optics. Should this not be possible on account of the conditions, it is sought to radiate at least so little light flux into the adjacent micro exit optics that there are no disadvantageous optical effects as a result, such as scattered light, which can lead to glare, etc.

In addition, the wording "wherein the micro entry optics are formed in such a way and/or the micro entry optics and the micro exit optics are arranged relative to one another in such a way" is also understood to mean that additional measures, such as screens (see further below), can be provided, which, either exclusively or preferably also in addition to their actual function, have the function of directing the entire light flux precisely onto the paired micro exit optics.

Due to the use of a number or multiplicity of micro-optics paired with one another instead of a single optics as in conventional projection systems, both the focal lengths and the dimensions of the micro-optics per se are much smaller than in a "conventional" optics. The average thickness compared with a conventional optics can also be reduced. As a result, the overall depth of the projection arrangement compared with a conventional optics can be considerably reduced, however a good or very good efficiency (efficacy) is also achieved by the size reduction of the optics per se. With a conventional optics, which remains substantially unchanged in terms of its dimensions and of which the focal width is reduced, the installation depth by contrast can indeed be reduced, however the efficacy deteriorates as a result.

The greater is the number of the micro-optics systems, the more accurately can the desired light distribution be produced, wherein an upward limit in respect of the number of the micro-optics systems is limited primarily by the available production methods. For the production of a dipped beam function, 30-40 micro-optics systems may be sufficient or favourable for example, wherein this is not intended to describe a limiting value upwardly or downwardly, but is intended to describe merely an exemplary number.

A light module of this type in addition can be scaled, i.e. a plurality of structurally identical or similarly constructed light modules can be combined to form a larger overall system, for example a vehicle headlight.

In accordance with a specific embodiment of the invention each micro entry optics focuses the light passing therethrough in at least one micro entry optics focal point.

Here, a micro entry optics focal point of each micro entry optics preferably is located before the paired micro exit optics in the light exit direction.

Each micro entry optics thus has a focal point which is located between the entry optics and exit optics and in which light of the associated micro entry optics is focused.

In particular, each micro entry optics focuses the light passing therethrough in the vertical direction onto the micro entry optics focal point lying before the micro exit optics, wherein the micro exit optics preferably each have a focal point coinciding with the micro entry optics focal point of the paired micro entry optics.

Light is thus focused in the focal point and then collimated accordingly in the vertical direction after passing through the associated micro exit optics and is projected into a region in front of the vehicle.

For the sake of completeness it should be mentioned here that reference is made in the simpler wording here and generally within the scope of this entire disclosure at other points to a focusing "in a focal point". In fact however, i.e. in reality, the light beams are not focused in a single focal point, but are imaged into a focal area containing said focal point. This focal area may be a focal plane, however this focal area is generally not flat on account of aberrations, but can also be "formed" curved, i.e. the light beams are imaged into a curved area containing the focal point.

Furthermore, each micro-optics system consisting of micro entry optics and micro exit optics advantageously widens the light passing therethrough in the horizontal direction.

For this purpose, each micro entry optics focuses the light passing therethrough in the horizontal direction onto a focal point located after the micro exit optics. This light passes through the micro exit optics and is focused thereby in the horizontal direction in a focal point located after the micro exit optics.

The micro entry optics are preferably formed as collecting optics, which collect light in a vertical and/or horizontal direction.

It may be that the micro entry optics are formed as free-form optics.

The micro exit optics are advantageously also formed as projection optics.

By way of example, the micro exit optics can be formed as spherical lenses or as aspherical lenses.

It may also be that the micro exit optics are formed as free-form lenses.

In a specific, particularly preferred embodiment of the invention the boundary surfaces facing towards one another of micro entry optics and micro exit optics paired with one another are formed congruently to one another and preferably are also arranged congruently to one another.

Here, the term "formed congruently" means nothing more than the fact that the boundary surfaces of micro-optics paired with one another have the same basic area shape, with in principle any spatial arrangement. The term arranged "congruently" means that these basic areas are in addition also arranged such that they either coincide congruently one another directly or are arranged at a distance, but would transition congruently into one another if displaced normal to one of the basic areas.

It is particularly advantageous if the optical axes of micro entry optics and micro exit optics paired with one another extend parallel to one another, wherein it is in particular advantageous if the optical axes coincide. In this way, the light pattern of each individual micro-optics system is imaged particularly exactly in terms of its position, such that, when the individual light patterns are superimposed to form a desired overall light distribution, for example a dipped beam distribution, this can be produced optimally from an optical viewpoint (for example optimal superimposition of the individual light-dark boundaries, etc.).

It is also expedient if the boundary surfaces are flat.

Here, the boundary surfaces of the optics can be hexagonal, rectangular or preferably square, for example.

In order to produce light distributions having defined shapes, example with one or more light-dark boundaries, at least one screen device can be arranged between the entry optics and the exit optics.

Here, the screen device preferably lies in a plane spanned by the micro exit optics focal points.

The micro exit optics focal points are those focal points in which the micro entry optics focus in the vertical direction, and where the focal points of the micro exit optics are also located.

In accordance with a specific embodiment the screen device for at least one pair of micro entry and micro exit optics paired with one another, preferably for a plurality of pairs, and in particular for all pairs, has a screen having in each case at least one, for example precisely one, optically effective screen edge.

By way of example, all screens here can have identical screen edges.

However, it may also be that at least two screens have differently formed screen edges.

In principle, a projection arrangement, as described above, has a number of micro-optics systems, i.e. pairs consist of in each case one micro entry optics and one micro exit optics. In the simplest embodiment without screen device, all micro-optics systems produce the same light distribution, which (partial) light distributions together form a full beam distribution, for example. Here, for the sake of simplicity, it is assumed that a complete light distribution is produced with precisely one light module. However, it may also be in practice that two or also more light modules according to the invention are used to produce the overall light distribution. This may then be expedient for example when, for example for space reasons, a distribution of the components among different positions in the headlight is necessary.

In order to produce a dimmed light distribution, for example a dipped beam distribution, which has a light-dark boundary as known, each micro-optics system can now be paired with more or less identical screens in the beam path, such that all micro-optics systems produce a light distribution having a light-dark boundary. The superimposition of all light distributions then gives the dimmed light distribution as overall light distribution.

Here, the screens in this case and in all other cases can be embodied as individual screens (for example in the form of an impermeable layer, for example a layer produced by vapour deposition, etc.), which "form" the screen device, however a screen device component can also be used, for example a planar film, etc., in which corresponding openings are provided for the passage of light Furthermore, it may also be that different screens are provided, i.e. that one or more micro-optics systems are paired with a first screen, and one or more other micro-optics systems are paired with another screen (or no screen), etc., such that different micro-optics systems form different light distributions. By selective activation of individual micro-optics systems (for which purpose however it is necessary for these to be paired with dedicated light sources that can be separately controlled, at least in groups), individual different light distributions can in this way be produced, which can also be operated in superimposition.

In accordance with a first variant of the invention the projection arrangement consisting of entry optics and exit optics, and where appropriate of screen arrangement, is formed in one part.

In accordance with a second variant the projection arrangement consisting of entry optics and exit optics is formed from two components which are separate from one another.

In such an embodiment a screen device can be+provided, such that it is expedient when the at least one screen device is arranged on the boundary surface of the entry optics facing towards the exit optics.

However, in this case it may also be that the at least one screen device is formed as a component formed separately from the entry optics and the exit optics.

A one-piece embodiment has the advantage that, following manufacture, which must be performed in an exact manner, a single, stable component is provided, which can be installed without difficulty.

In the case of an at least two-piece embodiment, in which the entry optics and exit optics are separate from one another, a positioning effort for the individual components is necessary during assembly, however it is advantageous in this embodiment that the individual components, as will be explained further below, can be moved relative to one another.

The invention is in particular advantageous when the at least one light source comprises at least one semiconductor light source, for example at least one light-emitting diode and/or at least one laser diode. The actual light source in the latter case, i.e. in the case of use of at least one laser diode, can be a luminous element or can comprise one or more luminous elements (luminous element for example in the form of what is known as a phosphor, an optoceramic, etc.), which is exposed to the beam of a laser, i.e. a laser diode, and is excited to emit light.

A corresponding IR diode is used for IR light.

It is also advantageous when at least one ancillary optics arrangement is arranged between the at least one light source and the at least one projection arrangement, into which at least one ancillary optics arrangement the at least one light source irradiates the light emitted thereby, and which ancillary optics arrangement is formed in such a way that the light exiting therefrom is directed substantially parallel.

The ancillary optics arrangement is preferably formed as a collimator.

In this way, the light exiting from the one or more light sources, in particular LED light source(s), can be optimally utilised.

In an advantageous embodiment, as already briefly discussed further above, the exit optics is advantageously mounted displaceably with respect to the entry optics.

It is in particular advantageous if the exit optics, in the installed position of the light module, is displaceable in the vertical and/or horizontal direction.

In this way the light pattern can be displaced in the vertical and/or horizontal direction, for example for headlight range regulation and/or for provision of a dynamic cornering beam function.

From an optical viewpoint it is expedient here when the exit optics is displaceable parallel to the entry optics, and/or parallel to a screen device provided where appropriate.

A separate actuator is preferably provided in order to displace the exit optics in each direction.

In accordance with a specific embodiment the least one actuator is a piezo actuator.

Is particularly advantageous when, as already explained further above, the light-emitting diodes and/or laser diodes of a light source are controllable independently of one another.

The term "controllable" is to be understood here primarily to mean a switching on and off. In addition, it may also be understood to mean the dimming of the light-emitting diodes and/or laser diodes of the light sources.

In addition, it is advantageous when, with two or more light sources for the light module, the light sources are controllable independently of one another. Here, the term "independently of one another" is to be understood to mean that actually all light sources can be controlled independently of one another, or that the light sources can be controlled independently of one another in groups.

In accordance with an embodiment of the invention each micro system consisting of a micro entry optics and a micro exit optics is paired with precisely one light source, which preferably comprises precisely one light-emitting diode or precisely one laser diode.

However, it may also be that one or more light sources are used, which irradiate light into a projection arrangement (consisting of a plurality of microsystems); here, the light is blended or widened by one (or more) appropriate ancillary optics 4, such that a light source irradiates light onto a plurality of microsystems, generally (in the case of one ancillary optics) onto all microsystems of a projection arrangement.

Not only exclusively, but in particular with the use of laser light sources, it has also proven to be favourable to provide two or more light source groups, wherein each light source group comprises at least one light source, and wherein light sources in the same light source group emit light of the same colour or wavelength, and wherein light sources in different light source groups emit light of different colour, and wherein each light source group illuminates a region of the at least one projection arrangement assigned in a dedicated manner to said light source group, and wherein the different regions are identical, or are configured for the production of identical light distributions.

The different regions can be formed in a projection arrangement or can be distributed over two or more projection arrangements.

In order to produce white light it is favourable when three light source groups are provided, wherein one light source group preferably emits red light, one light source group preferably emits green light, and one light source group preferably emits blue light.

The objects stated in the introduction are also achieved with a lighting device for a vehicle headlight, which lighting device comprises a number of microprojection light modules as described above.

Here, two or more groups of light modules can advantageously be provided for the lighting device, wherein each group comprises at least one, two or more light modules, wherein light modules within the same group produce the same light distribution, and wherein light modules from different groups produce different light distributions.

It may also be advantageous in this context when the light sources of each group of light modules are controllable independently of the light sources of the other groups.

Furthermore, the projection arrangements of light modules within the same group can form a common component.

In accordance with an alternative embodiment the projection arrangements of all light modules form a common component.

By way of example, in a lighting device according to the invention, the component or the common components is/are configured in the form of a film.

It is in particular favourable when, with a lighting device of this type, two or more groups are provided for the production of different light distributions, wherein each group forms a different light distribution, which for example is selected from one of the following light distributions:

turning beam light distribution;
town beam light distribution;
country road beam light distribution;
motorway beam light distribution;
light distribution for additional light for motorway beam;
cornering beam light distribution;
dipped beam light distribution;
dipped beam front-end light distribution;
light distribution for asymmetrical dipped beam in the far field;
light distribution for asymmetrical dipped beam in the far field in cornering beam mode;
full beam light distribution;
screen-free full beam light distribution.

It has also proven to be favourable, not just only, but in particular with the use of laser light sources, when the lighting device comprises two or more light modules, wherein each light module has at least one light source group, wherein each light source group comprises at least one light source, and wherein light sources in the same light source group emit the same colour, and wherein at least two light source groups are provided which emit light of different colours, and wherein each light source group illuminates a region of the at least one projection arrangement of its light module paired in a dedicated manner with this light source group, and wherein the different regions are identical, or are configured for the production of identical light distributions.

It is particularly advantageous when three groups of light source groups are provided, wherein one group of the light source groups preferably emits red light, one group of light source groups preferably emits green light, and one group of light source groups preferably emits blue light, and wherein each group of light source groups comprises at least one light source group.

A lighting device according to the invention can be part of a headlight, i.e. can be combined with one or more light modules of a different design to form a headlight, or the vehicle headlight is formed by the lighting device.

Figure 2C:
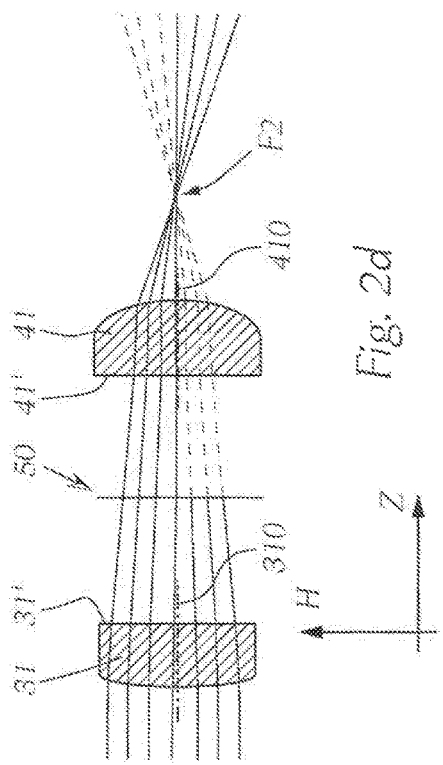
Figure 2B:
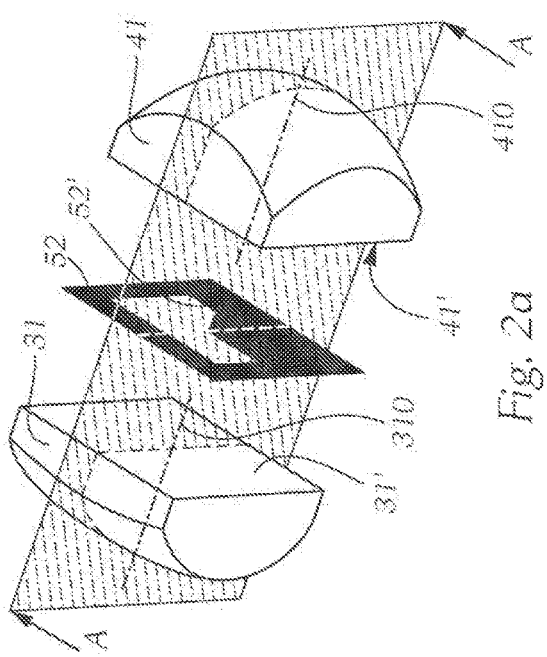
Figure 2D:
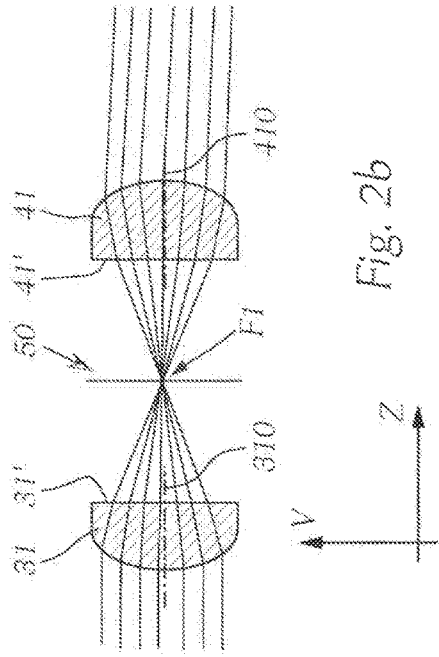
Figure 3B:
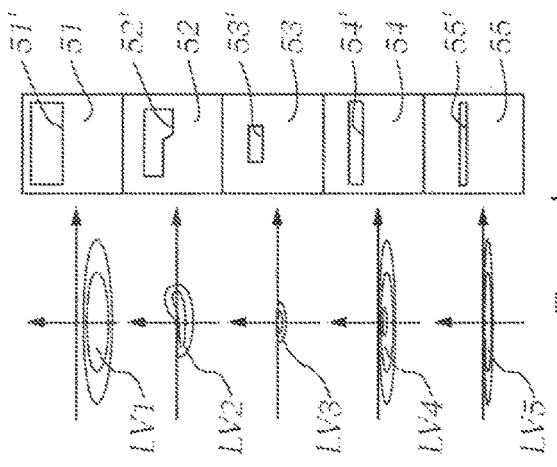
Figure 3A:
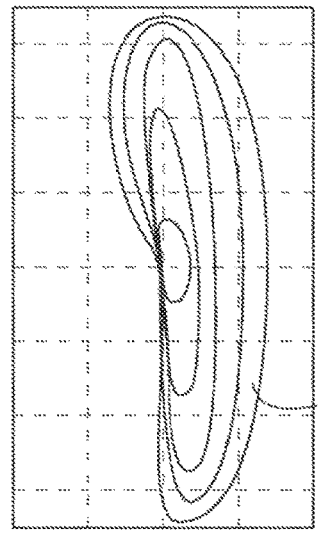
Figure 3:
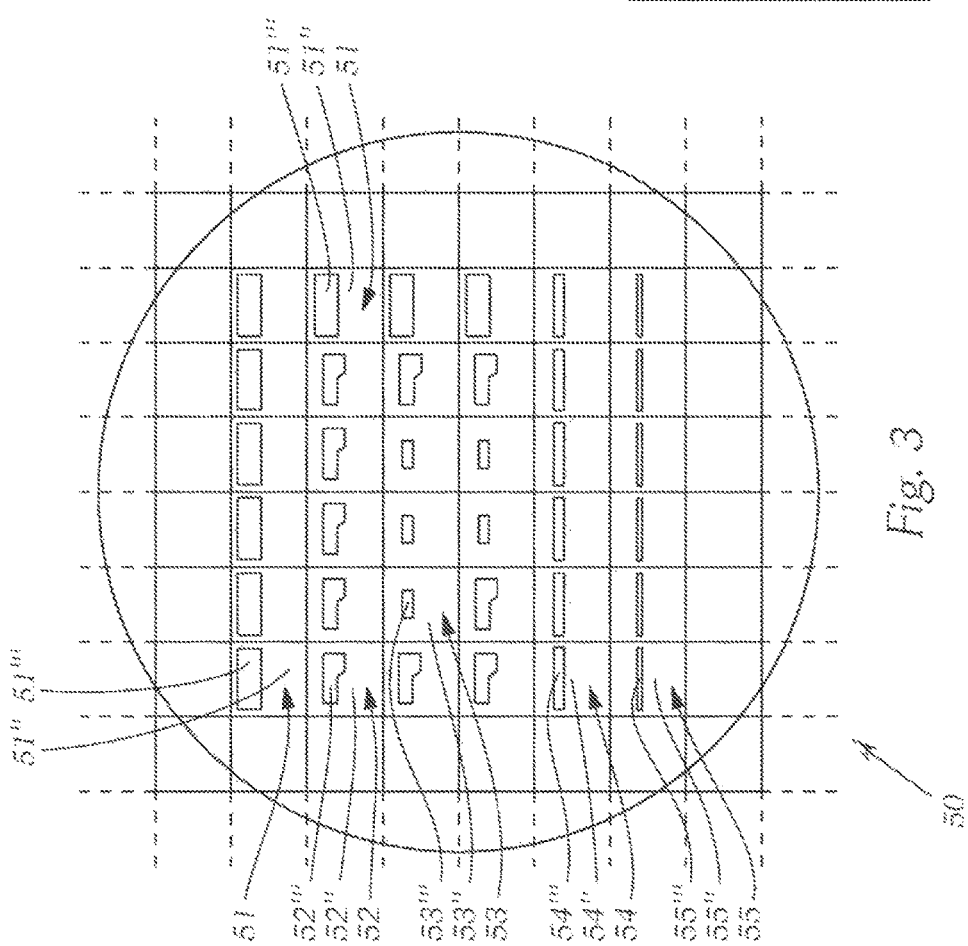
Figure 4A:
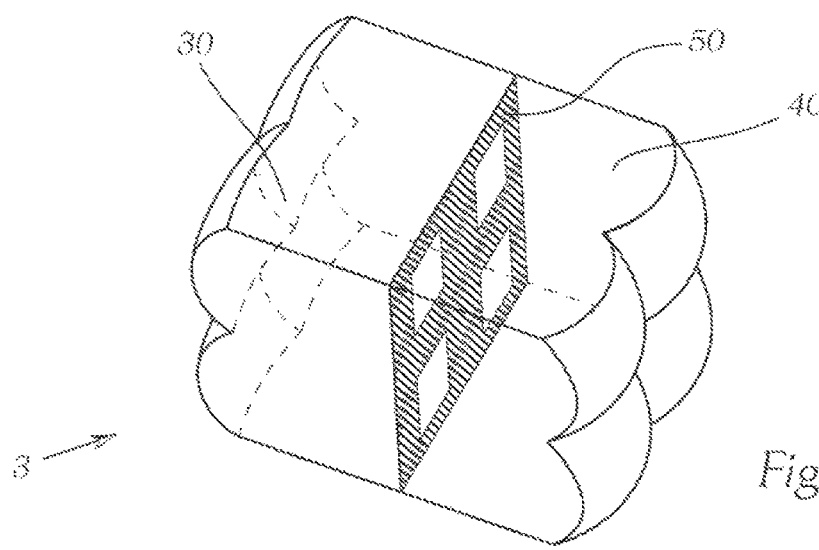
Figure 4B:
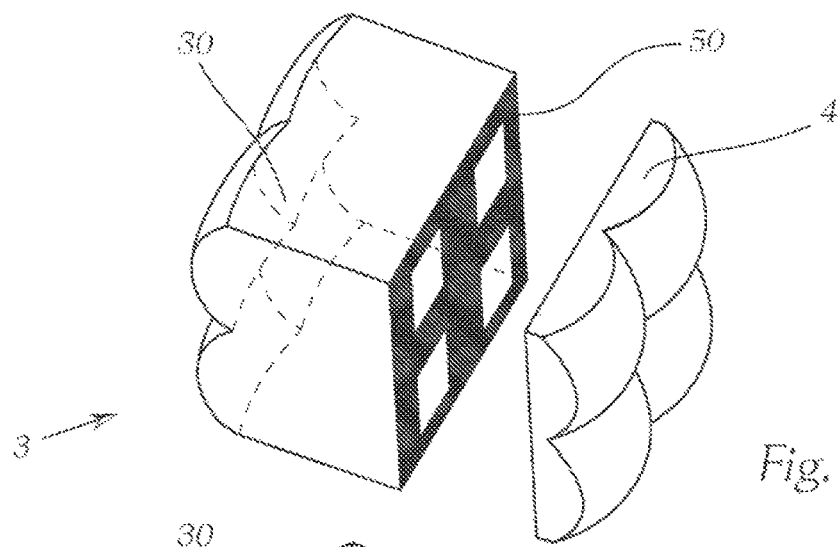
Figure 4C:
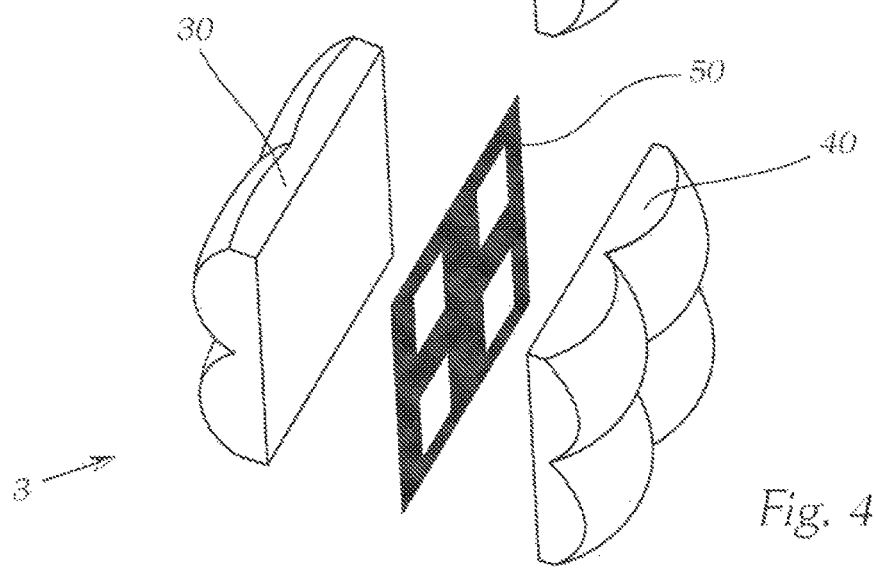
Figure 5:
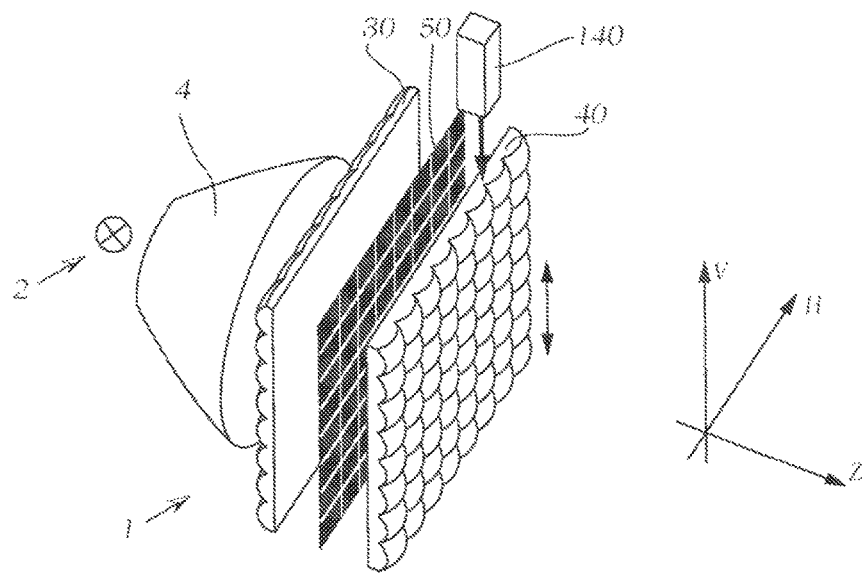
Figure 6:
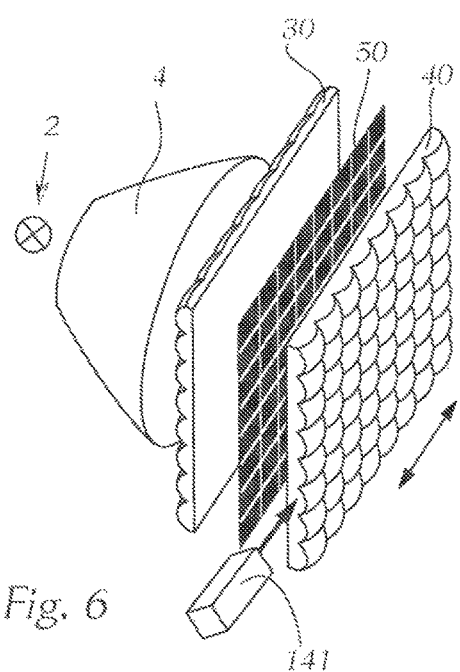
Figure 7:
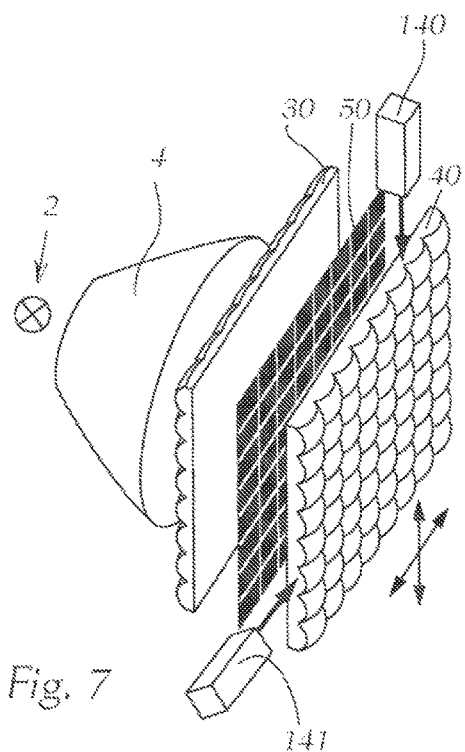
Figure 8A:
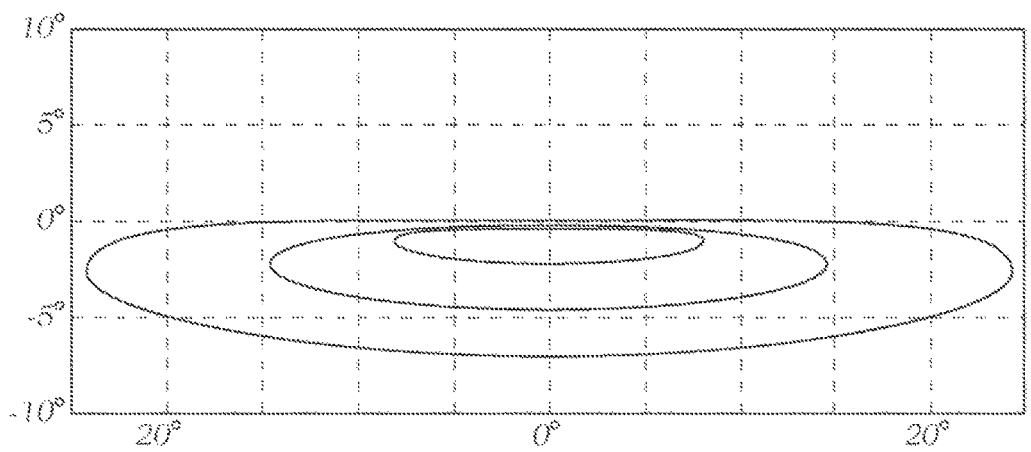
Figure 8B:
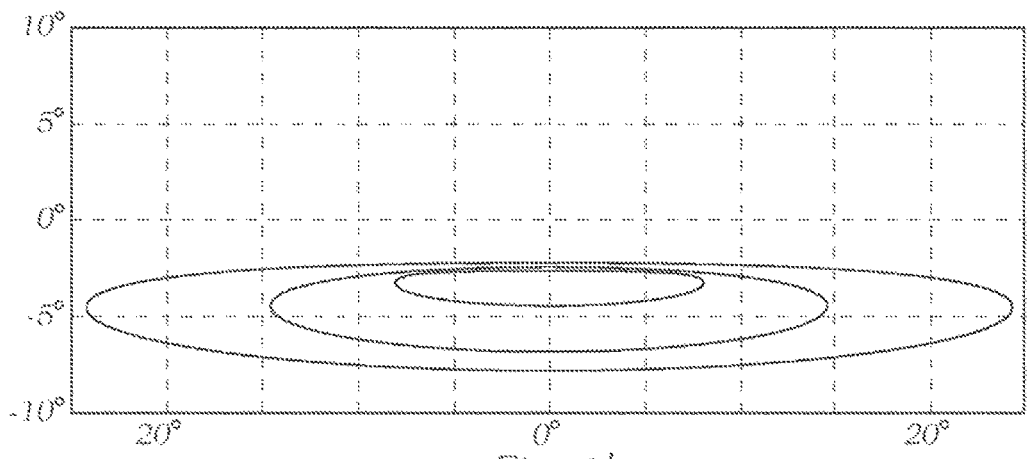
Figure 8C:
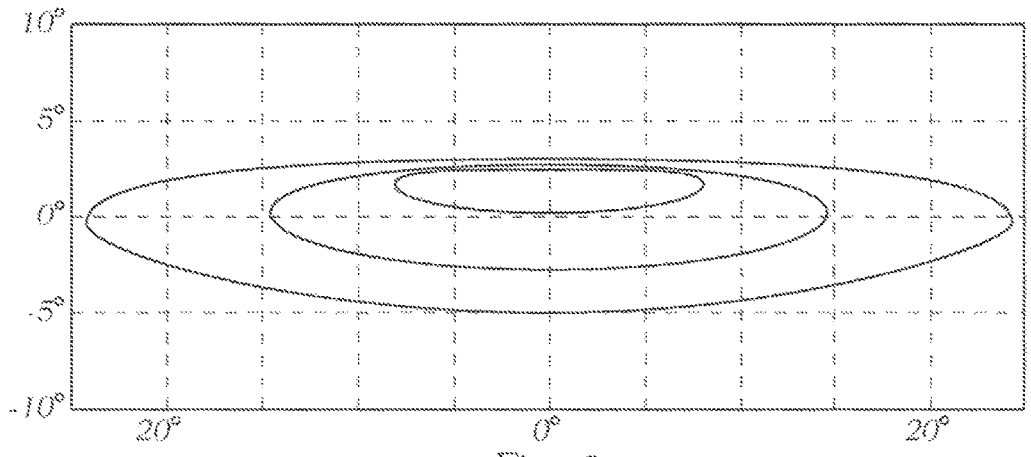
Figure 9A:
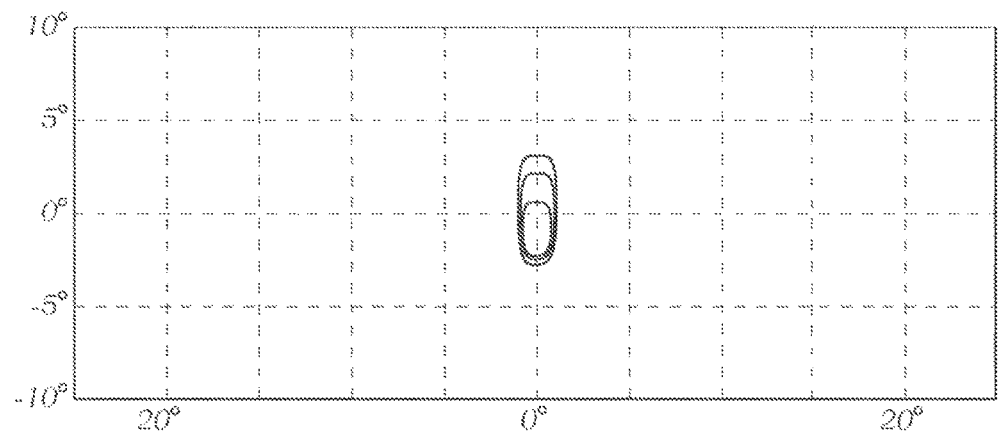
Figure 9B:
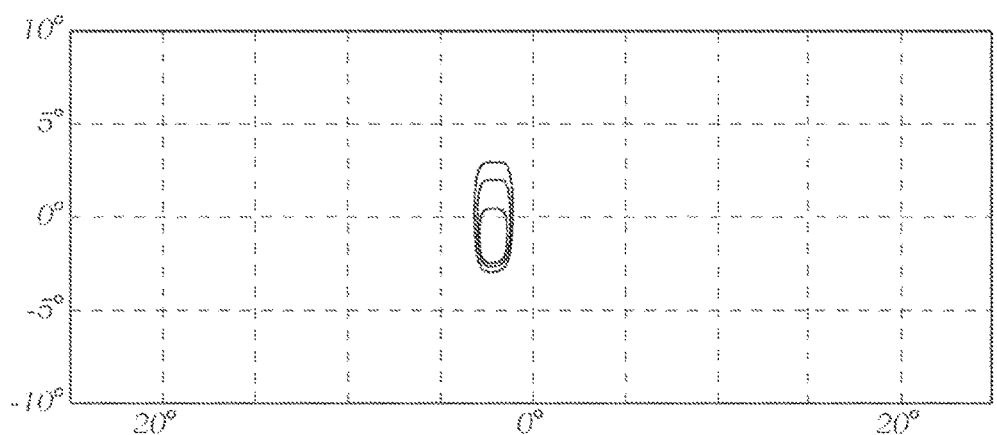
Figure 9C:
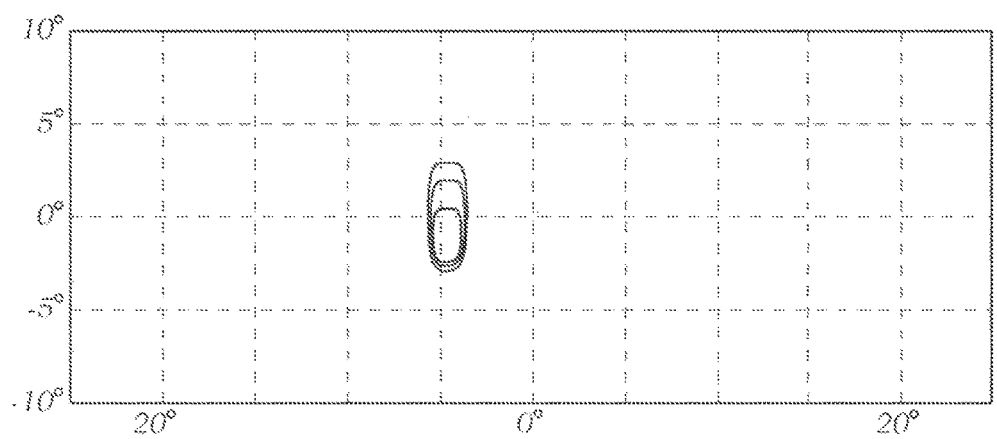
Figure 10:
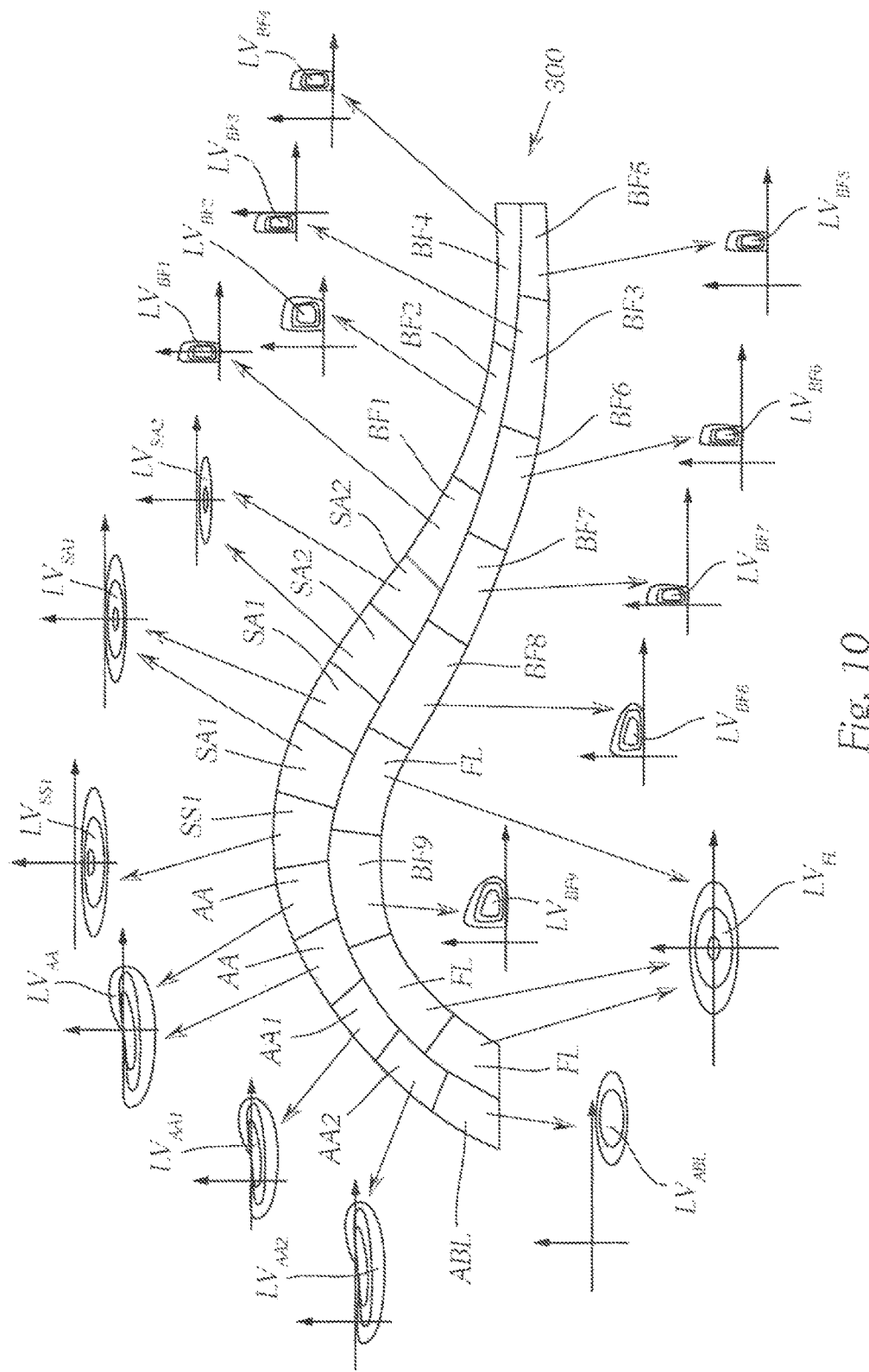
Figure 11A:
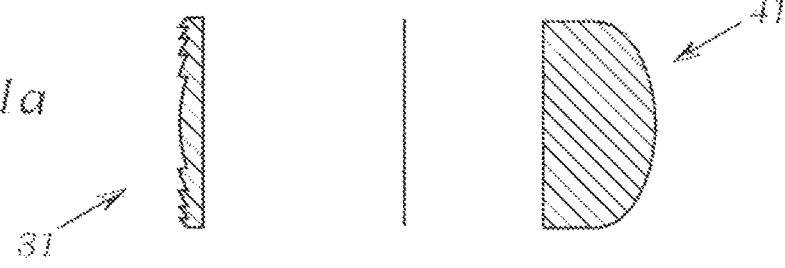
Figure 11B:
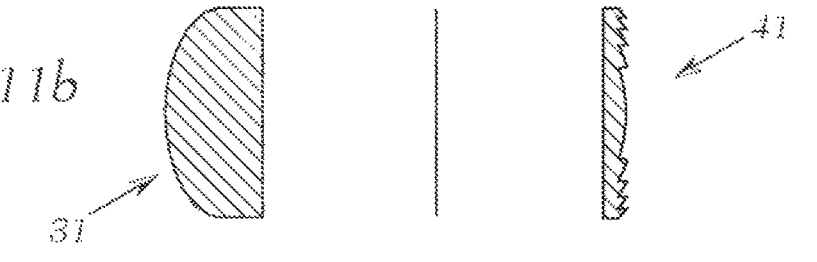
Figure 11C:
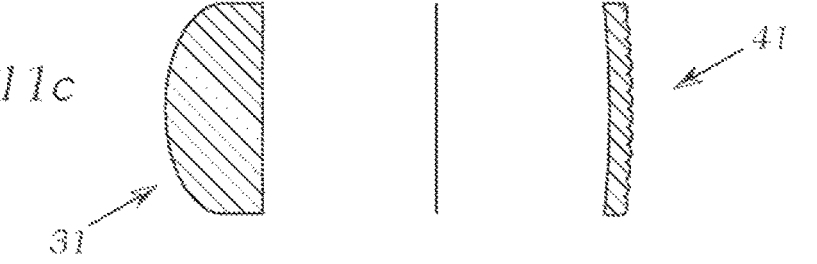
Figure 12:
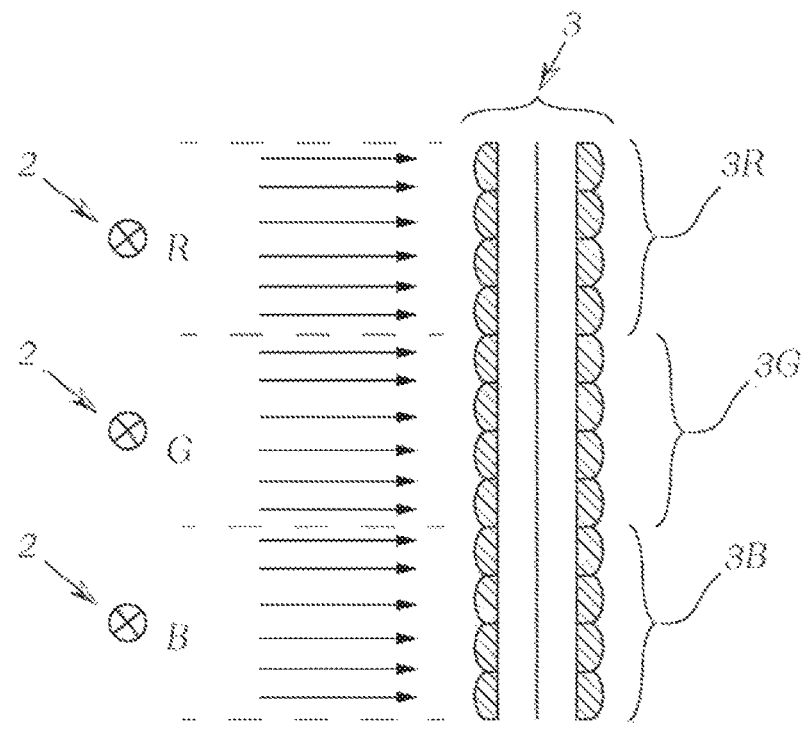

The invention will be explained in greater detail hereinafter on the basis of the drawing, in which FIG. 1 shows a schematic illustration of a microprojection light module according to the invention in an exploded illustration, FIG. 2 shows a schematic illustration of a further microprojection light module according to the invention in an exploded illustration, FIG. 2a shows a schematic illustration of a micro-optics system of a microprojection light module according to the invention in a perspective view and a vertical plane of section, FIG. 2b shows a section through the micro-optics system from FIG. 2a along the plane A-A, FIG. 2c again shows the illustration from FIG. 2a, with a horizontal plane of section, FIG. 2d shows a section through the micro-optics system from FIG. 2c along the plane B-B, FIG. 3 shows a schematic illustration of a screen device having a number of screens, FIG. 3a shows a schematic illustration of an overall light distribution, produced with a light module according to the invention having a screen device from FIG. 3, FIG. 3b shows the partial light distributions, produced with the individual screens of the screen device from FIG. 3, which together form the overall light distribution from FIG. 3a, FIG. 4a shows a schematic detail of a projection arrangement of a light module according to the invention in a one-part embodiment, FIG. 4b shows a schematic detail of a projection arrangement of a light module according to the invention in a two-part embodiment, FIG. 4c shows a schematic detail of a projection arrangement of a light module according to the invention in a three-part embodiment, FIG. 5 shows a microprojection light module as illustrated in FIG. 1, with an actuator for displacing the exit optics in the vertical direction, FIG. 6 shows a microprojection light module as illustrated in FIG. 1, with an actuator for displacing the exit optics in the horizontal direction, FIG. 7 shows a microprojection light module as illustrated in FIG. 1, with an actuator for displacing the exit optics in the vertical direction and an actuator for displacing the exit optics in the horizontal direction, FIG. 8a shows a schematic light distribution, FIG. 8b shows the effects of a displacement of the exit optics vertically downwardly on the light distribution from FIG. 8a, FIG. 8c shows the effects of a displacement of the exit optics vertically upwardly on the light distribution from FIG. 8a, FIG. 9a shows a partial light distribution, produced with a light module according to the invention or one or more micro-optics systems of a light module of this type, FIG. 9b shows the effects of a displacement of the exit optics horizontally to the left on the partial light distribution from FIG. 9a, FIG. 9c shows the effects of a further displacement of the exit optics horizontally to the left on the partial light distribution from FIG. 9a, FIG. 10 shows a schematic illustration of a lighting device, constructed from a number of microprojection light modules according to the invention, FIG. 11a-11c show different variants of micro-optics systems, and FIG. 12 shows a schematic arrangement for producing a white overall light distribution with use of light sources of different colours.

FIG. 1 schematically shows a microprojection light module 1 according to the invention for a motor vehicle headlight. The microprojection light module 1 has a light source 2 and a projection arrangement 3, which images the light exiting from the light source 2 into a region in front of the motor vehicle in the form of at least one light distribution. The illustrated coordinates designate the light exit direction Z, and the horizontal direction (H), which is normal to Z and normal to the vertical direction V.

The light source 2 is preferably a semiconductor light source, for example an LED light source, which has one or more LEDs. The light source can also consist of one or more laser diodes.

The light source 2 radiates its light into an ancillary optics 4, for example a collimator, which directs the light of the light source 2 substantially in parallel, before said light impinges on the projection arrangement 3.

This projection arrangement 3 comprises, as illustrated in FIG. 1, an entry optics 30, which consists of an array of micro entry optics 31, and an exit optics 40, which consists of an array of micro exit optics 41, wherein each micro entry optics 31 is paired with precisely one micro exit optics 41.

FIG. 2 shows a variant of a microprojection light module 1 according to the invention, in which three light sources 2 each irradiate light via a paired ancillary optics 4, which directs the light in parallel, into a common projection arrangement 3, which has a structure comparable to that shown in FIG. 1.

FIG. 2 is intended to illustrate that here, in principle, any arrangements are conceivable in which certain light sources each illuminate only defined regions of the projection arrangement 3. This can be used either to attain a sufficient illumination, however, as explained on the basis of the example of FIG. 2, it may also be that the regions of the projection arrangement 3 are formed differently depending on the paired light source. For example, three different light distributions can be produced with the three light sources, which, activated together, can form a certain overall light distribution.

The micro entry optics 31 in a light module according to the invention according to FIG. 1 or 2 are formed here in such a way and/or the micro entry optics 31 and the micro exit optics 41 are arranged relative to one another in such a way that the light exiting from one micro entry optics 31 enters precisely only into the paired micro exit optics 41, and wherein the light pre-shaped by the micro entry optics 31 is imaged by the micro exit optics 41 into a region in front of the motor vehicle as at least one light distribution LV1-LV5; GLV.

As can be deduced in general from these figures, a screen device 50 is also arranged between the entry optics 30 and the exit optics 40. With a screening device of this type, as will be explained in greater detail further below, the light flux passing through the projection arrangement can be trimmed in order to produce one or more light distributions of defined form, for example having one or more light-dark boundaries.

For the sake of completeness, it should also be mentioned here that the illustration in FIGS. 1 and 2 with substantially dark screen device 50 does not define the embodiment of the screen device 50 in any way. The illustration is purely schematic and is intended merely to indicate the presence of a screen device 50 and the approximate position thereof.

A screen device also is not absolutely necessary, i.e. the present invention can also be provided expediently without a screen device. In this case the light flux is not trimmed, and the light pattern is produced by the entry and exit optics. A screen device provides the advantage that a selective trimming of the light distribution can be provided in a simple way.

The entry optics 30 is a single component, which is formed by the micro entry optics 31. Here, the micro entry optics 31 are arranged directly adjacently, preferably with no distance therebetween, and form an array, as mentioned above and shown in FIGS. 1 and 2.

The exit optics 40 is also a single component formed by the micro exit optics 41. The micro exit optics 41 here are arranged directly adjacently, preferably with no distance therebetween, and form an array, as mentioned above and shown in FIGS. 1 and 2.

In addition, as will be explained in greater detail further below, the entry optics and the exit optics can be formed in one piece, jointly with the screen device where appropriate.

FIGS. 2*a* and 2*c* show a micro-optics system consisting of a micro entry optics 31 and a paired micro exit optics 41, which are formed and/or arranged as described above in such a way that light from the shown micro entry optics 31 passes exclusively into the paired micro exit optics 41. FIG. 2*a* also shows part of an optional screen device in the region between the two micro-optics 31, 41.

Under consideration of the micro-optics system from FIGS. 2*a* and 2*c*, it can be seen in FIG. 2*b* that the micro entry optics 31 focuses the light passing therethrough in the vertical direction in a micro entry optics focal point F1. FIG. 2*b* thus shows light beams which lie in a vertical plane (specifically the plane A-A from FIG. 2*a*) or the projection of light beams into this plane A-A.

The light beams emitted in parallel from the ancillary optics (not shown here) are thus focussed by the micro entry optics 31 in the micro entry optics focal point F1, which is located before the paired micro exit optics 41 in the light exit direction.

As already mentioned in the introduction, it should also be noted here for the sake of completeness that reference is made in the simpler wording here and generally within the scope of this entire disclosure at other points to a focusing "in a focal point". In fact however, i.e. in reality, the light beams are not focused in a single focal point, but are imaged into a focal area containing said focal point. This focal area may be a focal plane, however this focal area is generally not flat on account of aberrations, but can also be "formed" curved, i.e. the light beams are imaged into a curved area containing the focal point.

Each micro entry optics thus has a focal point F1, which is located between the entry optics and exit optics and in which light of the associated micro entry optics is focused.

The micro exit optics 41 also has a focal point coinciding with the paired micro entry optics 31. Light is thus focused in the focal point F1 and then collimated accordingly in the vertical direction as it passes through the associated micro exit optics 41 and is projected into a region in front of the vehicle, as illustrated schematically in FIG. 2*b*.

FIG. 2*d* shows the behaviour in the horizontal direction, i.e. beams are considered that lie in a horizontal plane, for example in the plane B-B from FIG. 2*c*, or the projection of beams into this plane. As can be seen in FIG. 2*d*, each micro-optics system consisting of micro entry optics 31 and micro exit optics 41 widens the light passing therethrough in the horizontal direction. For this purpose, each micro entry optics 31 focuses the light passing therethrough in the horizontal direction onto a focal point located after the micro exit optics 41. This light, however, passes beforehand through the micro exit optics 41 and is focused thereby in the horizontal direction in a focal point F2 located after the micro exit optics 41. The light is thus scattered in the horizontal direction in order to achieve the desired width of the partial light distributions of the individual micro-optics systems.

It should be noted again at this point that here an idealized optical system is described; in practice both first and second optics of a micro-optics system are often embodied as free-form optics, whereby an imaging as described above in a focal area is provided.

Generally, the above presentation indicates an exemplary specific embodiment. A key feature, irrespective of a focal point F2, is that the light passing through the micro-optics systems is widened in the horizontal.

The micro entry optics 31 are formed accordingly preferably as collecting optics, which collect light in the vertical and horizontal direction. Here, the micro entry optics 31 can be formed for example as free-form optics.

The micro exit optics 41 are usually formed as projection optics, for example as spherical or aspherical lenses. It may also be that the micro exit optics 41 are formed as free-form lenses.

Reference should be made briefly here at this juncture to FIGS. 11*a*-11*c*: in the description above and below, it is assumed that each micro entry optics 31 and each micro exit optics 41 is formed from a sole lens. However, it may also be that either the micro entry optics 31 and/or the micro exit optics 41 once again in each case consist of a number of "optics" or optical elements. Each of these "micro micro-optics elements" of a micro-optics must for this purpose have the same focal plane. By way of example, one or both micro-optics may be Fresnel lenses which have different optical regions. Each optical region (micro micro-optics) of a micro entry optics can, but does not have to, irradiate light into each micro micro exit optics.

FIG. 11*a* shows an example in which the micro entry optics and the micro exit optics in a micro-optics system are formed as Fresnel lenses.

FIG. 11*b* shows an example in which the micro entry optics is formed as a "conventional" lens and the micro exit optics is formed as a Fresnel lens.

FIG. 11*c* shows an example in which the micro entry optics is formed as a "conventional" lens and the micro exit optics is formed as an array of micro micro-lenses.

FIGS. 11*a*-11*c* show merely some conceivable variants, combinations or other sub-divisions of the micro-optics.

Furthermore, as can be deduced from FIGS. 2*a* and 2*c*, the boundary surfaces 31', 41' of micro entry optics 31 and micro exit optics 41 paired with one another facing towards one another are formed congruently to one another and are preferably also arranged congruently to one another.

Here, the term "formed congruently" means nothing more than the fact that the boundary surfaces of micro-optics paired with one another have the same basic area shape, with in principle any spatial arrangement. The term arranged "congruently" means that these basic areas are in addition also arranged such that they either coincide congruently with one another directly or are arranged at a distance, but would transition congruently into one another if displaced normal to one of the basic areas.

In addition, it is expedient when the boundary surfaces 31', 41' are flat.

In the shown example the surfaces 31', 41' are square; other shapes are rectangular or hexagonal.

The optical axes 310, 410 (FIGS. 2b, 2d) of micro entry optics 31 and micro exit optics 41 paired with one another extend in a favourable manner parallel to one another, wherein it is advantageous in particular when the optical axes 310, 410 coincide.

The screen device 50 lies in a plane spanned by the micro exit optics focal points F1. Here, the screen device 50 preferably has a screen for each micro-optics system (see FIGS. 2a and 2c), wherein the screen has one or more optically effective screen edges.

FIGS. 2a and 2c here show a micro-optics system which is paired with a screen 52 having an optically effective screen edge 52'. The light passing through this system is trimmed accordingly, and the screen edge 52' is imaged in the light pattern as a light-dark boundary.

When a screen device 50 is provided, this has a screen for a least one pair of micro entry and micro exit optics 31, 41 paired with one another. However, the screen device 50 preferably has a screen 51, 52, 53, 54, 55, having in each case at least one, for example precisely one, optically effective screen edge 51', 52', 53', 54', 55', for a plurality of pairs, in particular for all pairs.

The latter situation is illustrated schematically in FIG. 3. FIG. 3 shows a screen device 50 in a view from the front, wherein the screen device 50 has five different types of screens 51-55. Each of these screens 51-55 consists of a light-impermeable material 51"-55", which has precisely one (as illustrated) or more (not illustrated) light-permeable apertures 51'''-55''', through which light can pass. The light pattern is trimmed accordingly by the apertures, and the screen edges 51', 52', 53', 54', 55' of the screens are imaged in the respective partial light pattern as upper light-dark boundaries, which delimit the light pattern upwardly.

Each of these screens is paired with precisely one micro-optics system, and when all micro-optics systems are irradiated with light, an overall light distribution GLV is provided, as illustrated schematically in FIG. 3a as a superimposition of all partial light distributions. The shown overall light distribution GLV is, in the shown example, a dipped beam distribution with asymmetrical light-dark boundary.

FIG. 3b shows each of the screens 51-55 and to the left, beside the screen, schematically shows the partial light distribution LV1-LV5 produced therewith.

In this way, a dipped beam distribution for example can be produced with a light module according to the invention, wherein individual micro-optics systems each produce a defined contribution to the dipped beam distribution in the form of a partial light distribution.

In this way, any overall light distributions can be produced, and only certain partial light distributions can be activated (or masked out) selectively by illuminating, in groups, micro-optics systems with identical screens with in each case at least one dedicated light source, such that a dynamic light distribution can be produced, for example.

The design of the one or more entry optics and exit optics allows only a limited shaping of the light distribution in some circumstances. Due to the use of preferably standardised screens as described above, a number of partial lights distributions can be produced, which, with appropriate selection, lead to the desired overall light distribution.

The screens can be embodied for example also as individual screens, which "form" the screen device, however a screening device component is preferably used, as shown, for example a planar film etc., in which corresponding openings/apertures are provided for the passage of light.

As already mentioned briefly further above, in a first embodiment of the invention as shown in FIG. 4a, the projection arrangement 3 consisting of entry optics 30 and exit optics 40 and, as shown, a screen arrangement 50, where appropriate can be formed in one part. The optics body by way of example is a plastic optics, which has been purposefully carbonised in order to provide a screen device in the region in which the screen device is provided. A carbonisation of this type can be provided for example by laser beam or electron beam, etc.

In a second variant, which is shown in FIG. 4b, the projection arrangement 3 is formed from two separate components, more specifically an entry optics 30 and an exit optics 40, which are typically also arranged at a distance from one another.

In an embodiment of this type a screen device 50 is also provided, and it is therefore expedient when the screen device 50 is arranged on the boundary surface 31' of the entry optics 30 facing towards the exit optics 40.

The screen device can be the produced here by vapour deposition of the boundary layer 31', or by application of an absorbing layer, which is then selectively removed again for example by means of laser beam. It is also conceivable, by means of two-component injection moulding for example, to apply an exit optics to an entry optics provided in this way with a screen device, such that a component is ultimately again provided.

In this case, it may also be however that the at least one screen device 50 is formed as a component formed separately from the entry optics 30 and the exit optics 40, as shown in FIG. 4c. In this case the screen device 50 can be inserted in the form of a precise mask for example made of metal (perforated mask, slotted mask, grid, etc.).

It should also be noted at this juncture that in the previous figures the inner surfaces of the optics 30, 40 are smooth, whereas the outer surfaces are shown curved. In principle, it is also possible for one or both inner surfaces of the optics 30, 40 to be curved, however this is only possible in the case of en embodiment consisting of two or more parts.

A one-piece embodiment has the advantage that, following manufacture, which must be performed in an exact manner, a single, stable component is provided, which can be installed without difficulty.

In the case of an at least two-part embodiment, in which the entry and exit optics are separate from one another, a positioning effort for the individual components during assembly is necessary, however it is advantageous in this embodiment that the individual components, as explained in greater detail further below, can be moved relative to one another.

FIGS. 5-7 show embodiments in which the exit optics 40 is mounted displaceably with respect to the entry optics 30. The entry optics 30 and the screen device 50 formed separately therefrom (as shown) or jointly with the entry optics 30 (not shown) is/are formed separately from the exit optics 40 accordingly.

Here, in the installed position of the light module 1, the exit optics 40 is displaceable in a vertical (FIG. 5), horizontal (FIG. 6) or vertical and horizontal (FIG. 7) direction. In this way, the light pattern can be displaced in the vertical and/or horizontal direction, for example for headlight range regulation and/or in order to provide a dynamic cornering beam function.

Here, the exit optics 40 is preferably displaced parallel to the entry optics 30 and/or parallel to the screen device 50 provided where appropriate.

A separate actuator 140, 141 is provided in order to displace the exit optics 40 in each direction, wherein, in accordance with a specific embodiment, the at least one actuator 140, 141 is a piezo actuator. A typical path of movement for a piezo actuator of this type lies in the region of 100 µm. In principle, however, other actuators having a path of movement of <1 mm can also be used.

In order to achieve a uniform displacement of the entire light pattern, in which the light pattern per se therefore does not change, but instead only the position thereof, it is favourable when all micro-optics systems affected by the displacement, in particular the micro exit optics, have the same optical parameters, in particular are identical.

In addition, when designing the projection arrangement care should be taken to ensure that no light or only a small proportion of the light exiting from a micro entry optics enters into an unpaired micro exit optics, even in the event of a displacement of the exit optics.

However, the micro-optics systems can also be formed differently in order to achieve a purposeful modification of the light pattern.

In the specific exemplary embodiment a slight displacement of the imaging optics, i.e. of the exit optics for example by 0.03 mm, is sufficient for a displacement of the light pattern by 0.8°. By way of example, FIG. 8a shows a schematic light distribution, FIG. 8b shows the same light distribution following a displacement of the exit optics vertically downwardly, and FIG. 8c shows the effects of the displacement of the exit optics vertically upwardly on the light distribution. The form of the light distribution has not changed here or has only changed insignificantly, whereas the light distribution has shifted upwardly or downwardly.

A headlight range regulation of approximately 2.5° can be achieved for example with a stroke of approximately 1 mm.

As a result of the displacement of the exit optics, the light pattern can be distorted to a certain extent. When designing the system as a whole, it should be taken into account that these distortions must satisfy the legal and technical requirements.

FIG. 9a shows a partial light distribution produced with a light module according to the invention or one or more micro-optics systems of a light model of this type, FIG. 9b shows the effects of a displacement of the exit optics horizontally to the left on the partial light distribution from FIG. 9a, and FIG. 9c shows the effects of a further displacement of the exit optics horizontally to the left on the partial light distribution. FIG. 9b here shows a displacement of the imaging exit optics by approximately 0.1 mm, and FIG. 9c by approximately 0.2 mm.

As can be seen, a small displacement is sufficient to result in a noticeable displacement of the light pattern in the vertical and/or horizontal direction.

In the case of a conventional projection system having a projection lens, the lens has typical diameters between 60 mm and 90 mm. In a module according to the invention the individual micro-optics systems typically have dimensions of approximately 2 mm×2 mm (in V and H) and a depth (in Z) of approximately 6 mm-10 mm, and therefore a much shorter depth of a module according to the invention is provided in the Z-direction compared with conventional modules.

The light modules according to the invention have a short overall depth and in principle can be formed freely, i.e. it is possible for example to embody a first light module for producing a first partial light distribution separately from a second light module for a second partial light distribution and to arrange these offset from one another relatively freely, i.e. vertically and/or horizontally and/or in depth, such that design specifications can also be easily realised.

A further advantage of a light module according to the invention is that, although the projection arrangement has to be produced in a very accurate manner, which is possible however without difficulty by means of modern production methods, the exact positioning of the light source(s) relative to the projection optics is inapplicable for this. An exact positioning is only still of subordinate importance insofar as the at least one light source illuminates an entire array of micro entry optics which all produce substantially the same light pattern. In other words, this means merely that the "actual" light source is formed by the real light source(s) and the array of micro entry optics. This "actual" light source then illuminates the micro exit optics and where appropriate the paired screens. However, since the micro entry and micro exit optics are now already optimally adapted to one another, since these form a system so to speak, a non-exact positioning of the real light source(s) is of less consequence.

FIG. 10 shows a lighting device for a vehicle headlight comprising a number of microprojection light modules as have been described above. Here, a number of groups of different light modules are provided, for example FIG. 10 illustrates light modules of the groups AA, AA1, AA2, SS1, BF1-BF8, FL, ABL, SA1, SA2, which jointly form the lighting device. Each group AA, AA1, AA2, SS1, BF1-BF8, FL, ABL, SA1, SA2 comprises one, two or more light modules.

In the shown example each group contains precisely one light module, these being listed hereinafter. Here:

AA designates a light module for producing an asymmetrical dipped beam $LV_{AA}$ in the far field;

AA1, AA2 designates asymmetrical dipped beam $LV_{AA1}$, $LV_{AA2}$ in the far field in a cornering beam module SS1 designates a light module for producing a symmetrical light distribution $LV_{SS1}$ (front-end of a dipped beam, town beam);

BF1 . . . BF8 designate light modules for producing a glare-free full beam $LV_{BF1}$-$LV_{BF8}$; the individual light distributions $LV_{BF1}$-$LV_{BF8}$ produce jointly a full beam distribution or part thereof, the individual light distributions can be masked out independently of one another as required;

FL designates a light module for producing a full beam $LV_{FL}$;

ABL designates a light module for producing a turning beam $LV_{ABL}$;

SA1, SA2 designate additional light components for motorway beam $LV_{SA1}$, $LV_{SA2}$.

It is advantageous in a lighting device of this type when the light sources of each group of light modules AA, AA1, AA2, SS1, BF1-BF8, FL, ABL, SA1, SA2 are controllable independently of the light sources of the other groups, such that the individual light distributions or partial light distributions can be switched on and off and/or dimmed independently of one another.

FIG. 10 is a purely schematic illustration, and reference is made to "light modules" in conjunction with FIG. 10. In fact, FIG. 10 shows only and purely schematically the projection arrangements AA, AA1, AA2, SS1, BF1-BF8, FL, ABL, SA1, SA2 of the individual microprojection light modules, and as can be seen in FIG. 10 the projection arrangements AA, AA1, AA2, SS1, BF1-BF8, FL, ABL, SA1, SA2 of the individual light modules form a common component, for example in the form of a looped band. These projection arrangements can be arranged by way of example on a film.

The lens arrays can thus be formed freely from micro entry and micro exit optics with the present invention, and two or more light modules according to the invention can also be combined via a common projection arrangement component to form a lighting device, wherein the micro-optics systems are formed identically in those regions of the projection arrangement component paired with a certain light module (and therefore an independently controllable light source).

FIG. 12 lastly shows a further potential application of the invention. In accordance with this embodiment different regions, for example precisely three different regions, of micro-optics systems 3 are illuminated by light sources 2 of different colours (R, G, B), for example one region is illuminated with red light (R), another region is illuminated with green light (G), and a third region is illuminated with blue light (B).

The different regions can belong here to one projection module 3 (as illustrated), but also to different (two or more, for example three) projection modules or to one projection arrangement or to two or more, in particular three projection arrangements. Here, it is merely important that each different region of micro-optics systems produces the same light distribution as the other regions.

By superimposing the light patterns from the different regions, a white light pattern is then produced on the whole.

If laser light sources are used in this context as light sources—in particular see also the explanations further above—, only a few microprojection arrays (regions) are required to produce a white light distribution on account of the high luminous intensities of lasers, and therefore a smaller light module can be produced in the lateral direction.

The invention claimed is:

1. A motor vehicle headlight formed as a lighting device or comprising at least one lighting device, the lighting device or the at least one lighting device comprising:
a number of microprojection light modules (1) each comprising
at least one light source (2), and
at least one projection arrangement (3), which images light exiting from the at least one light source (2) into a region in front of the motor vehicle in the form of at least one light distribution, wherein the at least one projection arrangement (3) comprises
an entry optics (30) comprising a plurality of micro entry optics (31), and
an exit optics (40) comprising a plurality of micro exit optics (41), wherein
each micro entry optics (31) is paired with exactly one micro exit optics (41),
wherein the micro entry optics (31) are formed in such a way and/or the micro entry optics (31) and the micro exit optics (41) are arranged relative to one another in such a way that substantially all light exiting from the micro entry optics (31) enters only into the micro exit optics (41) paired therewith, wherein light pre-shaped by the micro entry optics (31) is imaged by the micro exit optics (41) into the region in front of the motor vehicle as the at least one light distribution (LV1-LV5; GLV), and wherein at least one screen device (50) is arranged between the entry optics (30) and the exit optics (40).

2. The headlight of claim 1, wherein each micro entry optics (31) is configured to focus light passing therethrough in at least one micro entry optics focal point (F1).

3. The headlight of claim 2, wherein the at least one micro entry optics focal point (F1) of each micro entry optics (31) is located before the micro exit optics (41) paired therewith in a light exit direction.

4. The headlight of claim 3, wherein each micro entry optics (31) is configured to focus light passing therethrough in a vertical direction onto the at least one micro entry optics focal point (F1) lying before the micro exit optics (30).

5. The headlight of claim 1, wherein the micro exit optics (41) each have a focal point (F1) coinciding with a micro entry optics focal point (F1) of the micro entry optics (31) paired therewith.

6. The headlight of claim 2, wherein a micro-optics system comprising the micro entry optics (31) and the micro exit optics (41) is configured to widen light passing therethrough in a horizontal direction.

7. The headlight of claim 1, wherein the micro entry optics (31) are formed as collecting optics.

8. The headlight of claim 1, wherein the micro entry optics (31) are formed as free-form optics.

9. The headlight of claim 1, wherein the micro exit optics (41) are formed as projection optics.

10. The headlight of claim 1, wherein the micro exit optics (41) are formed as spherical lenses or as aspherical lenses.

11. The headlight of claim 1, wherein the micro exit optics (41) are formed as free-form lenses.

12. The headlight of claim 1, wherein boundary surfaces (31', 41') facing towards one another of the micro entry optics (31) and the micro exit optics (41) paired with one another are formed congruently to one another and are also arranged congruently to one another.

13. The headlight of claim 12, wherein the boundary surfaces (31', 41') are flat.

14. The headlight of claim 1, wherein optical axes (310, 410) of the micro entry optics (31) and the micro exit optics (41) paired with one another extend parallel to one another.

15. The headlight of claim 14, wherein the optical axes (310, 410) coincide.

16. The headlight of claim 1, wherein the at least one screen device (50) lies in a plane spanned by a micro exit optics focal points (F1).

17. The headlight of claim 16, wherein the at least one screen device (50) for at least one pair of micro entry and micro exit optics (31, 41) paired with one another has a screen (51, 52, 53, 54, 55) having in each case at least one optically effective screen edge (51', 52', 53', 54', 55').

18. The headlight of claim 17, wherein all screens have identical screen edges.

19. The headlight of claim 17, wherein at least two screens have differently formed screen edges.

20. The headlight of claim 1, wherein the at least one projection arrangement (3) comprises a screen arrangement (50) formed in one part.

21. The headlight of claim 1, wherein the at least one projection arrangement (3) is formed from two components which are separate from one another.

22. The headlight of claim 1, wherein the at least one screen device (50) is arranged on a boundary surface (31') of the entry optics (30) facing towards the exit optics (40).

23. The headlight of claim 1, wherein the at least one screen device (50) is formed separately from the entry optics (30) and the exit optics (40).

24. The headlight of claim 1, wherein the at least one light source (2) comprises at least one semiconductor light source.

25. The headlight of claim 1, wherein at least one ancillary optics arrangement (4) is arranged between the at least one light source (2) and the at least one projection arrangement (3), into which the at least one light source (2) irradiates light emitted thereby, and which is formed in such a way that light exiting therefrom is directed substantially parallel.

26. The headlight of claim 25, wherein the at least one ancillary optics arrangement (4) is formed as a collimator.

27. The headlight of claim 21, wherein the exit optics (40) is mounted displaceably with respect to the entry optics (30).

28. The headlight of claim 27, wherein the exit optics (40), in an installed position, is displaceable in the vertical and/or horizontal direction.

29. The headlight of claim 27, wherein the exit optics (40) is displaceable parallel to the entry optics (30) and/or parallel to a screen device (50).

30. The headlight of claim 27, wherein at least one actuator (140, 141) is provided in order to displace the exit optics (40) in each direction.

31. The headlight of claim 30, wherein the at least one actuator (140, 141) is a piezo actuator.

32. The headlight of claim 1, wherein light-emitting diodes and/or laser diodes of the at least one light source are controllable independently of one another.

33. The headlight of claim 1, wherein the at least one light source comprises two or more light sources that are controllable independently of one another.

34. The headlight of claim 1, wherein a micro system comprises the entry optics (31) and the micro exit optics (41) paired with precisely one light source, which comprises precisely one light-emitting diode or precisely one laser diode.

35. The headlight of claim 1, wherein two or more light source groups are provided, wherein each light source group comprises at least one light source (2), and wherein light sources (2) of the at least one light source in the same light source group emit light of the same colour (R, G, B) or wavelength, and wherein light sources in different light source groups emit light of different colour (R, G, B), and wherein each light source group illuminates a region (3R, 3G, 3B) of the at least one projection arrangement assigned in a dedicated manner to said light source group, and wherein the different regions (3R, 3G, 3B) are identical, or are formed for the production of identical light distributions.

36. The headlight of claim 35, wherein three light source groups are provided, wherein one light source group emits red light, one light source group emits green light, and one light source group emits blue light.

37. The headlight of claim 1, wherein two or more groups of light modules (AA, AA1, AA2, SS1, BF1-BF8, FL, ABL, SA1, SA2) are provided, wherein each group comprises one, two or more light modules (1), wherein light modules (AA, AA1, AA2, SS1, BF1-BF8, FL, ABL, SA1, SA2) within the same group produce the same light distribution ($LV_{AA}$, $LV_{AA1}$, $LV_{AA2}$, $LV_{SS1}$, $L_{VBF1}$-$L_{VBF8}$, $LV_{FL}$, $LV_{ABL}$, $LV_{SA1}$, $LV_{SA2}$), and wherein light modules from different groups produce different light distributions ($LV_{AA}$, $LV_{AA1}$, $LV_{AA2}$, $LV_{SS1}$, $L_{VBF1}$-$L_{VBF8}$, $LV_{FL}$, $LV_{ABL}$, $LV_{SA1}$, $LV_{SA2}$).

38. The headlight of claim 37, wherein the light sources of each group of light modules are controllable independently of the light sources of the other groups.

39. The headlight of claim 37, wherein the projection arrangements (3) of light modules (AA, AA1, AA2, SS1, BF1-BF8, FL, ABL, SA1, SA2) within the same group form a common component.

40. The headlight of claim 39, wherein the component or the common components (300) is/are configured in the form of a film.

41. The headlight of claim 37, wherein the projection arrangements (3) of all light modules form a common component (300).

42. The headlight of claim 37, wherein two or more groups are provided for the production of different light distributions ($LV_{AA}$, $LV_{AA1}$, $LV_{AA2}$, $LV_{SS1}$, $LV_{BF1}$-$LV_{BF8}$, $LV_{FL}$, $LV_{ABL}$, $LV_{SA1}$, $LV_{SA2}$), wherein each group forms a different light distribution ($LV_{AA}$, $LV_{AA1}$, $LV_{AA2}$, $LV_{SS1}$, $LV_{BF1}$-$LV_{BF8}$, $LV_{FL}$, $LV_{ABL}$, $LV_{SA1}$, $LV_{SA2}$), which is selected from one of the following light distributions ($LV_{AA}$, $LV_{AA1}$, $LV_{AA2}$, $LV_{SS1}$, $LV_{BF1}$-$LV_{BF8}$, $LV_{FL}$, $LV_{ABL}$, $LV_{SA1}$, $LV_{SA2}$):
  turning beam light distribution;
  town beam light distribution;
  country road beam light distribution;
  motorway beam light distribution;
  light distribution for additional light for motorway beam;
  cornering beam light distribution;
  dipped beam light distribution;
  dipped beam front-end light distribution;
  light distribution for asymmetrical dipped beam in the far field;
  light distribution for asymmetrical dipped beam in the far field in cornering beam mode;
  full beam light distribution; and
  screen-free full beam light distribution.

43. The headlight of claim 37, further comprising two or more light modules, wherein each light module has at least one light source group, wherein each light source group comprises at least one light source, and wherein light sources in the same light source group emit the same colour (R, G, B), and wherein at least two light source groups are provided which emit light of different colours, and wherein each light source group illuminates a region (3R, 3G, 3B) of the at least one projection arrangement of its light module paired in a dedicated manner with this light source group, and wherein the different regions (3R, 3G, 3B) are identical, or are configured for the production of identical light distributions.

44. The headlight of claim 43, wherein three groups of light source groups are provided, wherein one group of light source groups emits red light, one group of light source groups emits green light, and one group of light source groups emits blue light, and wherein each group of light source groups comprises at least one light source group.

45. The headlight of claim 1, wherein the micro entry optics (31) are arranged in an array, and the micro exit optics (41) are arranged in an array.

* * * * *